United States Patent [19]
Ford et al.

[11] Patent Number: 4,711,275
[45] Date of Patent: Dec. 8, 1987

[54] AIR SUPPLY AND CONTROL APPARATUS FOR INFLATABLE MATTRESS

[75] Inventors: Victoria L. Ford, Southsea; Bryan J. Morgan, London, both of England

[73] Assignee: Pegasus Airwave Limited, Portsmouth, United Kingdom

[21] Appl. No.: 936,229

[22] Filed: Dec. 1, 1986

[30] Foreign Application Priority Data

Dec. 4, 1985 [GB] United Kingdom ............... 8529809

[51] Int. Cl.⁴ .............................................. B67C 3/12
[52] U.S. Cl. ................................... 141/95; 141/114; 141/192; 5/453; 5/455; 417/5; 417/7
[58] Field of Search ..................... 141/1–12, 141/37–70, 83, 84, 99–107, 115–128, 234–248, 13, 67, 68, 114, 313–317, 94, 95, 96, 192; 5/453, 455, 456, 446, 447; 417/5, 7, 3

[56] References Cited

U.S. PATENT DOCUMENTS

| | | | |
|---|---|---|---|
| 3,060,858 | 10/1962 | Shoosmith | 417/3 |
| 4,178,132 | 12/1979 | Shiraishi et al. | 417/5 |
| 4,259,038 | 3/1981 | Jorgensen et al. | 417/5 |
| 4,542,547 | 9/1985 | Sato | 5/453 |
| 4,609,854 | 9/1986 | Yamamoto et al. | 5/453 |
| 4,617,690 | 10/1986 | Grebe | 5/455 |
| 4,631,767 | 12/1986 | Carr et al. | 5/453 |
| 4,637,083 | 1/1987 | Goodwin | 5/453 |

*Primary Examiner*—Houston S. Bell, Jr.
*Attorney, Agent, or Firm*—Larson and Taylor

[57] ABSTRACT

An air supply and control apparatus for an inflatable mattress 2 has several air compressors 1 which are operated in turn, during normal operation, to inflate the mattress 2. In the case of the pressure in the mattress 2 falling below an upper preset value the air supply is provided by having more than one air compressor 1 operate simultaneously. The apparatus has electronic circuitry for effecting this alteration of the mode of operation when pressure sensing means 4 detects a fall in mattress pressure. In the case of a more severe drop in mattress pressure a valve 16 in an air outlet of the mattress 2 is closed under control of the electronic circuitry. The apparatus is particularly suitable for use with a mattress 2 having a plurality of separately inflatable regions, air being supplied to the regions from the air compressors 1 via a distributor 3.

12 Claims, 2 Drawing Figures

AIR SUPPLY AND CONTROL APPARATUS FOR INFLATABLE MATTRESS

The invention relates to air supply and control apparatus for an inflatable mattress for use with bedridden patients.

Such mattresses have a number of tubes arranged in arrays which are inflated and deflated in cycle so that the part of the patient's body which experiences the greatest pressure is constantly changed. At times some parts of the body which lie over deflated parts of the mattress will experience no pressure as the body is supported elsewhere by the inflated arrays. In this way the occurrence of pressure sores can be reduced.

Inflation and deflation of the arrays is achieved by means of an air supply and control system, for example as described in GB No. 1,595,417 or as made by us. Included in this is an alarm system which is activated when the pressure in the mattress falls below a certain level. The alarm system will also be activated if there is a power failure.

The present invention provides an air supply and control apparatus for an inflatable mattress comprising a plurality of air compressors for inflating the mattress; control means providing a first mode of operation in which the compressors are operated sequentially and cyclically, and a second mode of operation in which two or more of the compressors are operated simultaneously; and pressure sensing means connect to the control means for switching from said first to said second mode of operation if the pressure in the mattress falls below a higher preset level.

The air supply and control apparatus preferably also includes a fan to cool the compressors, an air distribution valve for distributing air to the arrays of the mattress, and a safety valve, e.g. a solenoid valve, in a vent, to close this vent and prevent deflation, or further deflation of the mattress through the vent. In addition to regulating the operation of the compressors the electronic circuit may provide a fused power supply for these components and may warn of malfunctioning of the system.

The currently used air supply and control apparatuses have several disadvantages. In general a single compressor or pump is used to inflate the arrays and the internal pressure of the mattress, and therefore the degree of support and comfort it offers, is controlled by a throttle valve which regulates the flow of air being fed to the air distributor and thence to the mattress. This throttle valve may be adjusted for example by nursing staff, according to how firm they feel the mattress ought to be. There is a time delay of some 10 minutes between the action of adjustment and the resulting change in pressure of the mattress. This makes the system awkward and difficult to use and monitor and often machines are found to be incorrectly set. This has often led to call outs by service engineers when all that was required was adjustment.

The present invention employs a number of compressors which can be operated sequentially, and preferably has a monitoring and control feedback system for the air supply. This is achieved for example by feeding a small amount of air from each of the mattress arrays through a restricting device which prevents too much air from bleeding from an inflated array to a deflated array, to two adjustable pressure switches which detect loss of pressure. These signal to the microprocessor which in turn controls the various electrical components of the system. When the pressure falls below a higher preset level the electronics circuitry will bring into operation at least one of the non-operating pumps to restore the mattress pressure. Should the pressure fall even further, below a lower preset level, the safety valve closes to prevent further deflation of the mattress through the normal vent to atmosphere.

A further disadvantage of the currently used systems is that since a single compressor or pump is used it must be run continuously and tends to become over stressed. In the past a single rotary vane compressor has often been employed. Failures of that pump tend to be catastrophic, leading to deflation of the mattress to the detriment and distress of the patient.

The present invention uses a number of compressors, preferably three linear compressors, a design in which, although performance may deteriorate with age and wear, catastrophic failure is unlikely.

In the system of the present invention a number of pumps are operated sequentially, one at a time for short periods e.g. each "on" period for each compressor is in the range 5 to 30 minutes, more preferably 5 to 15 minutes. In this way the life expectancy of the pumps is increased since each has time in which to cool down while the other(s) are in use. The further advantages of this arrangement are as explained above that in the event of a temporary pressure drop or pressure failure in the mattress all the pumps can be brought into operation to restore pressure, and where one pump fails completely the others can be used to keep the mattress operational so that no discomfort is caused to the patient while a new pump is installed.

The alarm system which has been incorporated in previous designs has been run from a battery. The alarm system is necessarily run from a back-up power supply so that the alarm buzzer will still sound in the event of a mains power failure. In the present invention the alarm system is preferably also controlled by the microprocessor and the battery may be replaced by a capacitor which is charged up from a D.C. power supply derived from the mains when the unit is switched on. Thus the alarm system is self-resetting and there is no possibility that nursing staff, for example, can forget to switch on the alarm circuitry.

Some or all of the components of the air supply and control apparatus may be controlled by a microprocessor in the electronic circuitry.

In order to control these components there have previously been used a large number of electronic devices in semiconductor chips. This makes the apparatus expensive and fault finding becomes complex. In the present invention the microprocessor may be used to effect communication between all parts of the system and the number of chips used is significantly reduced, bringing down the size and cost and increasing the efficiency of the unit and providing additional control and monitoring features.

One embodiment of the air supply and control apparatus of the invention will now be described with reference to the accompanying diagrams in which.

In the apparatus of the present invention any one of three compressors 1, indicated D, E and F may be used to provide pressure for the three arrays A, B and C of tubes in the mattress 2. Air supply is provided to a distributor 3 which cyclically connects the arrays to the operations source of pressure.

The distributor 3 may be as described in our earlier Patent, GB No. 1,595,417, in which case air supply is provided via throttles to the distributor 3 which cyclically connects the arrays to a source of pressure and of vacuum so that each array is successively (i) inflated, (ii) allowed to deflate partially by seepage through perforations in the mattress, or by leakage into a neighbouring array and (iii) actively deflated by connection to the vacuum source. The whole cycle takes about 7½ minutes.

Figure 1:
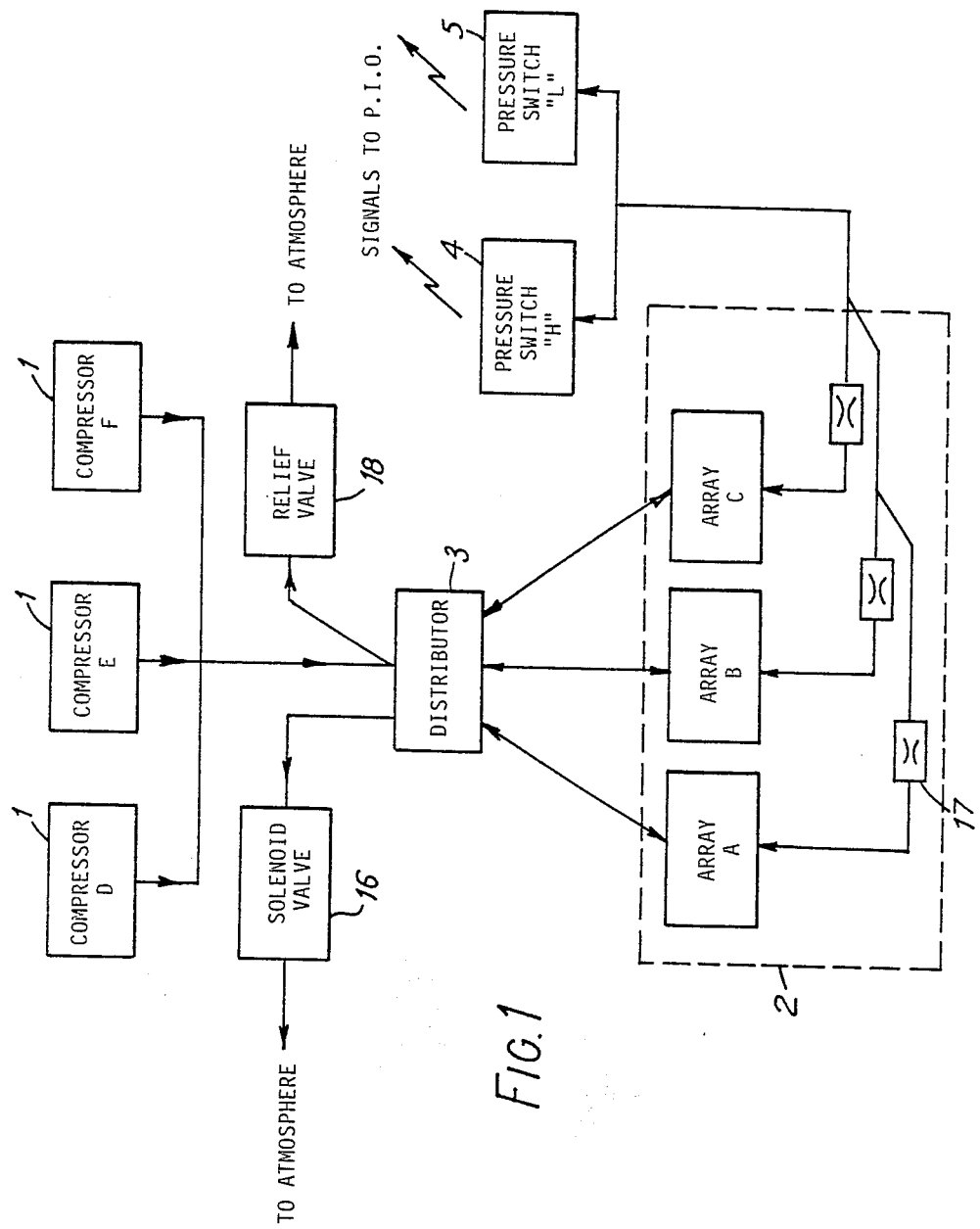
FIG. 1 shows a block diagram of part of the air supply and control apparatus.

With this arrangement the average mattress pressure, as detected by two pressure switches 4,5 tends to fluctuate widely during the 7½ minute cycle. An alternative, preferable arrangement is to feed the air supply directly, as shown in FIG. 1, to a similar distributor of which the porting is such that each array is successively (i) partially inflated by transferring air from a previously fully inflated array (ii) inflated gradually in a series of steps to give a gradual increase in pressure (iii) partially deflated by transferring air to a previously deflated array (iv) fully deflated by exhausting to atmosphere via an open valve 16. This particular arrangement of transfer ports has the added advantage of consuming less air thus allowing smaller, lighter and quieter compressors to be used. The compressors may for example be linear compressors as made by Nitto Kohkai, and having a 15 W power rating.

Each of the compressors D,E and F has a life expectancy of about 5000 hours. Compressor D is allowed to run for ten minutes before being switched off and compressor E brought into operation. When compressor E has been running for ten minutes it is switched off and compressor F switched on and this sequential operation of the compressors 1 is repeated over and over. In this way each compressor 1 is out of use for twenty minutes of the thirty-minute-cycle. This "rest period" prevents overheating of the compressors, increases the life expectancy of each, and reduces the likelihood of catastrophic failure.

Figure 2:
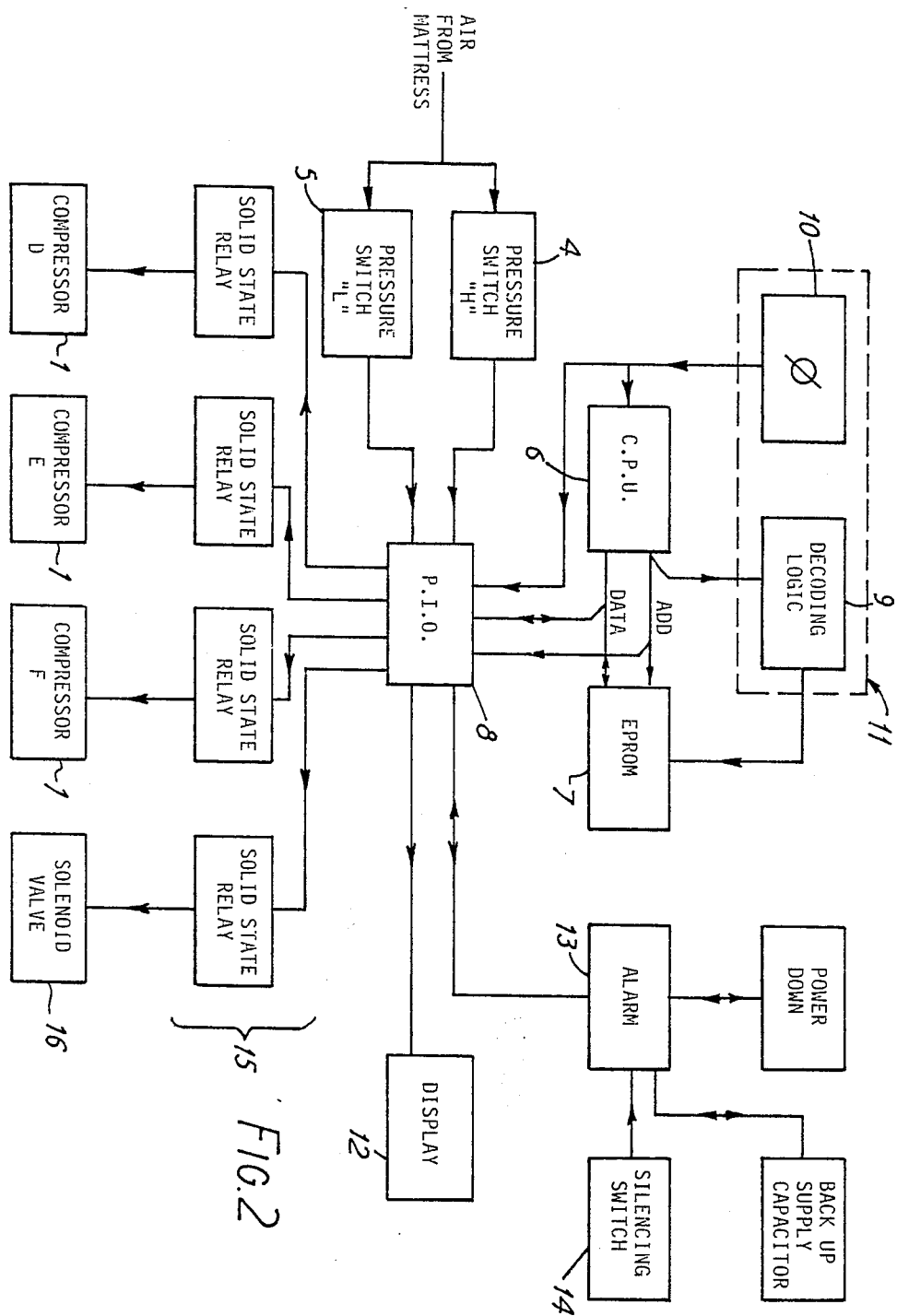
FIG. 2 shows a block diagram of the electronic circuit of the control apparatus.

The air supply and control apparatus includes electronic circuitry which regulates its operation. The circuitry is represented in the form of a block diagram at FIG. 2. In this diagram the lines merely indicated that a connection exists between the particular components rather than denote individual wires. The electronic circuitry includes as microprocessor a Z80A central processor unit (CPU) 6 linked to an erasable program read only memory (EPROM) 7. A parallel input output (PIO) chip 8 communicates between the CPU 6 and the other electrical components of the apparatus, for example the compressors 1. The EPROM decoding logic 9 and the clock 10 for the CPU 6 and PIO 7 are combined as one Schmitt trigger chip 11. This is an unusual arrangement since a number of chips would usually be required. Appropriate programming of the EPROM enables this considerable simplification to be made with a reduction in the cost and size of the unit. The total number of chips required to run the apparatus is reduced from twelve in the absence of a microprocessor to six in the illustrated apparatus of this invention.

The apparatus includes a display unit 12 which has LEDs which indicate the status of the system. The display circuitry 12, alarm 13, silencing switch 14 and mains appliances circuitry 15, which includes fused power supply for the compressors 1, distributor 3, solenoid valve 16 can all communicate via the PIO 8 and CPU 6.

The present invention employs a number of compressors which can be operated sequentially, and a monitoring and control feedback system for the air supply. This is achieved by feeding a small amount of air from each of the mattress arrays through a restricting device 17, which prevents too much air from bleeding from an inflated array to a deflated array, to two adjustable pressure switches 4,5 which are used to sense the air pressure in the mattress.

When the system is functioning normally only one compressor is running at one time and a green light emitting diode (LED) is illuminated on the status display panel of the display unit 12. If the mattress pressure should fall below a preset level, this is detected by pressure switch 4, labelled "H", which signals to the CPU 6 to turn on the spare compressors to restore the correct mattress pressure. If the pressure returns above the level "H", the extra pumps are cut out and the system continues to run normally. If the pressure should fall further, pressure switch 5, labelled "L", will detect this and signal to the CPU 6.

The green LED on the status display panel will be extinguished and a red one illuminated, and the solenoid valve 16 on the exhaust port of the distributor valve 3 will close to prevent further deflation of the mattress 2. This valve is preferably of a type that is open when it is energised and so the system will be sealed if the apparatus is disconnected from the mains power supply.

If the pressure in the mattress should remain low for a period of 10 minutes the red LED will start to flash and an alarm piezo-electric transducer will emit a warning tone. This tone may be silenced by pressing a "Silencing" button but the red LED will continue flashing until it receives a message from the CPU 6 via the PIO 8 that pressure has been restored. The alarm 13 will also sound in the event of disconnection from the mains power. The back-up power supply may be provided in the form of a large capacity capacitor. The alarm system is reset by the CPU 6 when normal running is resumed or mains power restored.

Preferably the back-up power supply capacitor is a 3.3 Farad wet plate (CMOS) capacitor of the type that is usually used as back-up for a RAM. Batteries used in prior art air supply and control apparatuses have shown an inclination to overheat, bulge and even explode. The capacitor can keep the alarm buzzer sounding for in excess of one hour after a fault develops if no action is taken. Where there is only a momentary loss of mains power the alarm 13 will give a very brief buzz. The capacitor will be charged up to maximum capacity 30 seconds after power is applied.

Over-inflation of the mattress and overloading of the compressors is prevented by a pressure relief valve 18 mounted on the body of the distributor and connected to the air chamber and thus to each array when the distributor 3 is in the appropriate position.

Connected to the exhaust port of the distributor valve is the solenoid valve 16 which may be shut to prevent air from escaping from the mattress through the normal exhaust.

The distributor 3 also forms a quickly detachable coupling for the air pipes which connect the mattress 2 to the air supply. This takes the form of eight spouts which fit into holes drilled in a boss to which the pipes are connected. An air seal is provided by "O" rings seated in the annular grooves around the spouts. This facilitates quick and easy connection of the mattress to its air supply.

A fan is preferably provided to keep the compressors cool in operation.

It will be apparent that the air supply and control apparatus of this invention may by appropriate programming of the microprocessor be used to operate any sort of inflatable mattress. In addition by use of spare lines of the PIO numerous other functions may be included in the design. For example a fire extinguisher could be automatically turned on in the event of severe overheating.

It will be apparent that in place of a microprocessor any suitable data processing apparatus may be used.

We claim:

1. Air supply and control apparatus for an inflatable mattress comprising a plurality of air compressors for inflating the mattress; control means providing a first mode of operation in which the compressors are operated sequentially and cyclically, and a second mode of operation in which at least two of the compressors are operated simultaneously; and pressure sensing means connected to the control means for switching from said first to said second mode of operation if the pressure in the mattress falls below a higher preset level.

2. Air supply and control apparatus according to claim 1 including a valve for connection in an air outlet of the mattress, and pressure sensing means connected to the valve for closing the valve when the pressure in the mattress falls below a lower preset level.

3. An air supply and control apparatus according to claim 2 including means for producing an alarm signal when the pressure in the mattress has fallen below said lower preset level.

4. An air supply and control apparatus according to claim 3 wherein said alarm means is arranged to be initiated a predetermined period after the pressure in the mattress has fallen below said lower preset level.

5. An air supply and control apparatus according to claim 3 operable by a main power supply and wherein the alarm means is provided with a back-up power supply which comprises a capacitor which is normally charged while the main power supply is present and which discharges on disconnection of the power supply to operate the alarm.

6. An air supply and control apparatus according to claim 5 wherein the alarm comprises a piezo-electric transducer element which emits an audible signal when actuated.

7. Air supply and control apparatus according to claim 1 for connection to a mattress which has a plurality of separately inflatable regions, the apparatus further including distributor means having an inlet means to receive air from said compressors and a plurality of air outlets for connection to respective inflatable areas of the mattress, the distributor means being operable cyclically to direct air intermittently to each inflatable region of the mattress.

8. Air supply and control apparatus according to claim 7 wherein the distributor also has means allowing, during its cyclic operation, intermittent transfer of air from a region of higher inflation to a region of lower inflation of the mattress.

9. Air supply and control apparatus according to claim 7 wherein the distributor further has air vent means and means allowing during its cyclic operation intermittent connection of each said region of the mattress to the air vent.

10. Air supply and control apparatus according to claim 9 including a valve connected to said air vent means and pressure sensing means connected to the valve for closing the valve when the pressure in the mattress falls below a lower preset level.

11. An apparatus according to claim 1 wherein the control means includes a processor for providing electronic signals for providing the first or second modes of operation, a clock for controlling the timing of the processor, a memory circuit for storing a program for the processor, and a decoding circuit for controlling the generation of program signals from the memory circuit to the processor in dependence on signals to the decoding circuit from the processor.

12. An apparatus according to claim 11 wherein the clock and the decoding circuit are integrated in the same integrated circuit component.

* * * * *